United States Patent [19]
Holland, Sr.

[11] 3,799,617
[45] Mar. 26, 1974

[54] AXIAL SUPPORTING VEHICLE WHEELS ENGAGEABLE WITH LOAD BEARING ROLLERS

[75] Inventor: John G. Holland, Sr., Houston, Tex.

[73] Assignee: Rolligon Corporation, Houston, Tex.

[22] Filed: Mar. 8, 1973

[21] Appl. No.: 339,409

Related U.S. Application Data
[62] Division of Ser. No. 148,585, June 1, 1971, Pat. No. 3,744,585.

[52] U.S. Cl............. 301/5 P, 280/DIG. 7, 152/352
[51] Int. Cl....................... B60b 19/00, B60c 11/06
[58] Field of Search........ 301/5 R, 5 P; 280/DIG. 7; 180/74; 152/8, 9, 352, 209; 305/34

[56] References Cited
UNITED STATES PATENTS

| | | | |
|---|---|---|---|
| 2,802,541 | 8/1957 | Albee | 152/9 |
| 2,861,643 | 11/1958 | Wald, Jr. | 180/74 |
| 2,990,026 | 6/1961 | Albee | 180/74 |
| 3,023,826 | 3/1962 | Larson | 280/DIG. 7 |
| 3,180,305 | 4/1965 | Rempel | 305/35 EB |

Primary Examiner—Robert S. Ward, Jr.
Assistant Examiner—V. N. Sakran
Attorney, Agent, or Firm—Jefferson D. Giller; James F. Weiler; William A. Stout

[57] ABSTRACT

Elongated, flexible-walled wheels for vehicles carrying a load on their axles and having one or more load supporting rollers engageable with the outer periphery of the wheel. The vehicle being axially driven and/or roller driven. The wheels including a plurality of cleats for providing a gripping relationship with the ground and the outer periphery also including one or more pad portions free of cleats extending circumferentially around the wheel for engaging one or more supporting and/or driving rollers. The axial extent of said pad portions being at least as great as the axial extent of a coacting roller for preventing the roller from contacting the wheel periphery. The smooth portion on the wheel including a plurality of continuously circumferentially wrapped layers of material whose outer edges decrease inwardly to the wheel.

8 Claims, 7 Drawing Figures

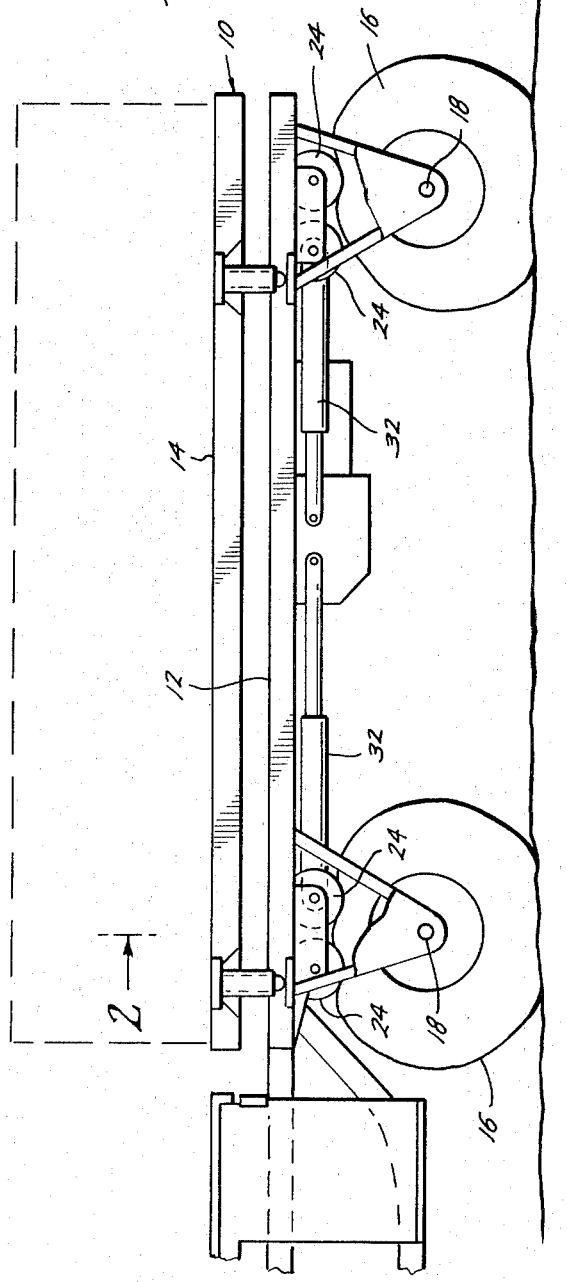

AXIAL SUPPORTING VEHICLE WHEELS ENGAGEABLE WITH LOAD BEARING ROLLERS

CROSS-REFERENCE TO RELATED APPLICATION

This application is a division of copending patent application Ser. No. 148,585 filed June 1, 1971, now U.S. Pat. No. 3,744,585.

BACKGROUND OF THE INVENTION

Vehicles having axially elongated, flexible-walled wheels which are peripherally loaded and driven such as shown in Reissue U.S. Pat. No. Re 24,272 and U.S. Pat. No. 2,990,026 have been used in the past. However, such roller driven vehicles, in certain environments, such as mud and swamps, fail to provide the necessary traction and drive requirements as slippage occurred between the roller and the wheel and also between the wheel and the ground. In addition, vehicles having an axially elongated, flexible-walled wheel have been used which are axially driven. While these latter vehicles have provided sufficient drive, their use has been limited to a small load carrying capacity.

The need are arisen for a load carrying vehicle for carrying heavy loads in off-the-road environment such as rough, uneven or rocky ground, or over soft or difficult terrain, such as sand, swamps, snow or mud, or upon water using an axially elongated, flexible-walled, fluid-distensible wheel. The present invention is directed to various improvements in an axially elongated, flexible-walled wheel having a high load capacity and/or a high drive or pulling capacity.

SUMMARY

The present invention is directed to an axially elongated, flexible-walled ground contacting vehicle wheel with coaxial axle means supporting a load sustaining structure in which the outer periphery of the wheel includes at least one smooth circumferentially extending surface for coacting with one or more load sustaining rollers connected to the structure which engage the smooth portion of the wheel.

Still a further object of the present invention is the provision of power drive means connected to either or both of the axle means and the rollers for powering the vehicle.

Yet a further object of the present invention is the provision of an axially elongated and flexible-walled wheel having a plurality of cleats thereon to provide traction with the ground and including one or more circumferentially extending smooth portions for providing a wearing surface, drive force surface and load bearing surface for contact by top rollers with the smooth portion constructed to provide a wheel that will withstand the forces imposed thereon to provide a long life.

Still a further object of the present invention is the provision of an axially elongated, flexible-walled ground contacting wheel having one or more radially outwardly extending circumferentially smooth wearing pad portions on the outer portion of the wheel which pad portion includes a plurality of continuously circumferentially wrapped layers of material with one or more rollers engageable with each smooth wearing pad which may be moved into and out of contact with the wheel for load carrying and powering as desired.

A further object of the present invention is to increase the life of the wheel. In the present invention, the axial extent of the pad is less than the axial extent of the wheel enabling the outer surface of the pad which contacts load bearing rollers to remain parallel to the wheel axle thereby reducing the difference of relative peripheral velocities between the pad, the roller and reducing wheel wear due to scrubbing. In addition, pthe axial extent of the pad is at least as great as the axial extent of the coacting roller for preventing the roller from contacting and wearing the wheel periphery.

BRIEF DESCRIPTION OF THE DRAWINGS

FIG. 1 is an elevational view, partly schematic, illustrating a vehicle according to the present invention, FIG. 2 is a cross-sectional view taken along the line 2—2 of FIG. 1.

DESCRIPTION OF THE PREFERRED EMBODIMENT

Figure 3:
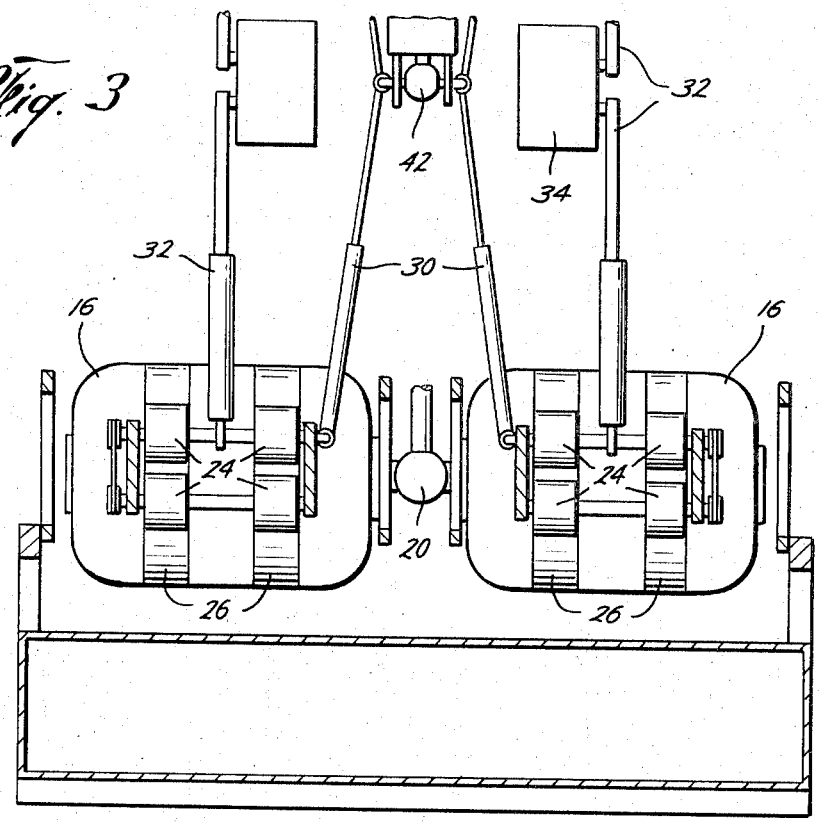
FIG. 3 is a cross-sectional view taken along the line 3 3 of FIG. 2.

Referring now to the drawings, particularly to FIG. 1, the reference numeral 10 generally indicates a vehicle of the present invention which generally includes a load sustaining structure 12 for supporting any suitable load and a plurality of wheels 16, here shown for convenience only as being four.

The wheels 16 are axially elongated, flexible-walled, fluid-distensible wheels such as air bags generally disclosed in Reissue U.S. Pat. No. Re 24,272. Wheels 16 have suitable coaxially axle means 18 such as means which may project from each end of the wheels 16 for connection to and supporting the load structure 12. Suitable drive means including differential 20 are connected to the axles 18 for axially driving the wheels 16 and thus the vehicle 10. Of course, the drive means may be omitted, for example if the vehicle 10 is a trailer. In order to provide sufficient drive traction and a gripping relationship of the wheels 16 with the ground, a plurality of cleats 22 are provided about the outer periphery of the wheels 16 extending in size and spacing sufficient to give good traction depending on such factors as load and environment. However, the amount of axle loads which can be carried by the wheels 16 is limited as under heavy loads the tires 16 will tend to belly upward and make injurious contact with the load structure 12. Therefore, one or more top rollers 24 are provided connected to the load supporting structure 12 so as to be engageable with the wheels 16 and which function as rollers with or without power as desired to increase the loading capacity and/or the drive capacity of the vehicle 10. In order that the cleats 22 do not interfere with the rollers 24, the outer periphery of the wheel 16 includes one or more circumferentially smooth portions 26, which may include a pad of less axial extent than the axial extent of wheel 16, as more fully described hereinafter, alinged with each of the rollers 24 which provide a surface of contact. Suitable means, either vertically moving or horizontally moving, such as the horizontally moving cylinder and piston assemblies 32 may be provided for moving the rollers 24 into and out of contact with the cleat free portions 26 of the wheels 16.

Of course, any desired number of rollers 24 may be positioned for engagement with each of the cleat free smooth portions 26 and for convenience only, as best seen in FIG. 1, two rollers 24 are shown for engagement with each of the cleat free smooth portions 26. As shown in FIG. 1, the hydraulic piston and cylinder assemblies 32 may be actuated by suitable controls (not shown) for moving one or all of the rollers 24 into engagement with the wheels 16. As shown in FIG. 1, for purposes of illustration only, all of the rollers 24 are in engagement with the first set of wheels 16, but only one of the rollers is in engagement with the second set of wheels 16. Of course, all of the rollers 24 can be actuated to be moved into total engagement with the wheels 16 or completely retracted out of engagement if desired. The number of rollers 24 which are placed in engagement with the wheels 16 depends upon the load carried by the vehicle. The greater the load, the more of the rollers 24 would be placed in contact for either load supporting and/or drive. And, of course, if the load was sufficiently light, all of the rollers 24 would be removed from contact with the wheels 16 and the load would be supported entirely from the axles 18 as the rollers 24 would not be needed and it would be desirable to retract them for reducing unnecessary friction and wear.

In addition, suitable drive means are connected from a drive transmission 42 to each of the rollers 24 for powering the rollers against the smooth portions 26 to provide drive solely by the rollers 24 or as additional drive for the vehicle 10.

It is noted that the cleat free portions 26 and the rollers 24, when used with a wheel having cleats 22, are of a small axial length as compared to the axial length to the wheels 16 so as not to adversely reduce the periphery surface of the wheel 16 containing the cleats 22, but yet provide a structure to supplement the load carrying capacity and/or drive capacity of the axial drive system of the wheels 16. However, in some uses the cleats 22 may be entirely omitted and the portions 26 and rollers 24 may be of greater axial extent. For example in snow, mud, slime and water, a cleated wheel is more suitable and the cleated portions should be of greater axially width. However, on sand, hard ground and rocks, a wheel with less cleat area is more suitable.

Figure 4:
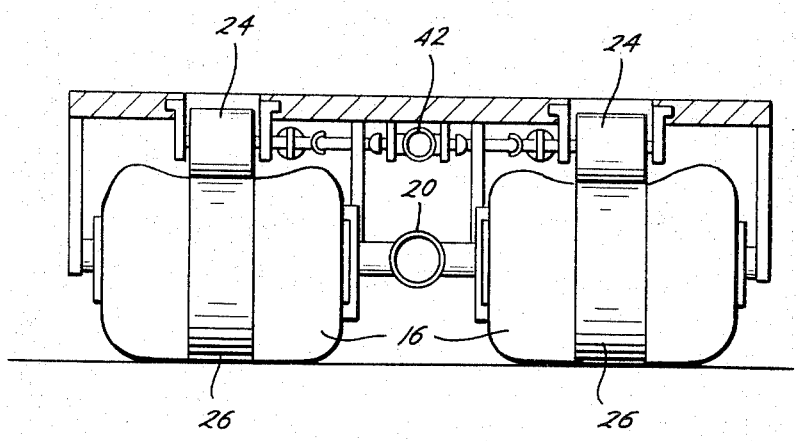
FIG. 4 is an end elevational view of another embodiment of the present invention.

While the embodiment of FIGS. 1-3 having a plurality of pads 26 and a plurality of rollers 14 in contact with each pad is desired for maximum load carrying and drive capacity, the embodiment of FIG. 4 having only one smooth portion 26 for each wheel 16 and one roller 24 for each portion 26 may be used for lighter capacity vehicles 10.

Figure 5:
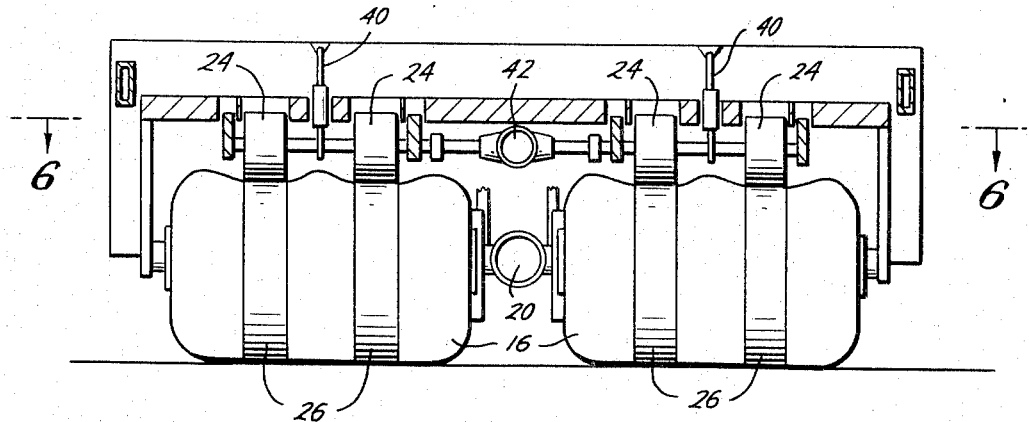
FIG. 5 is an elevational view, partly schematic, illustrating another embodiment of the present invention.
Figure 6:
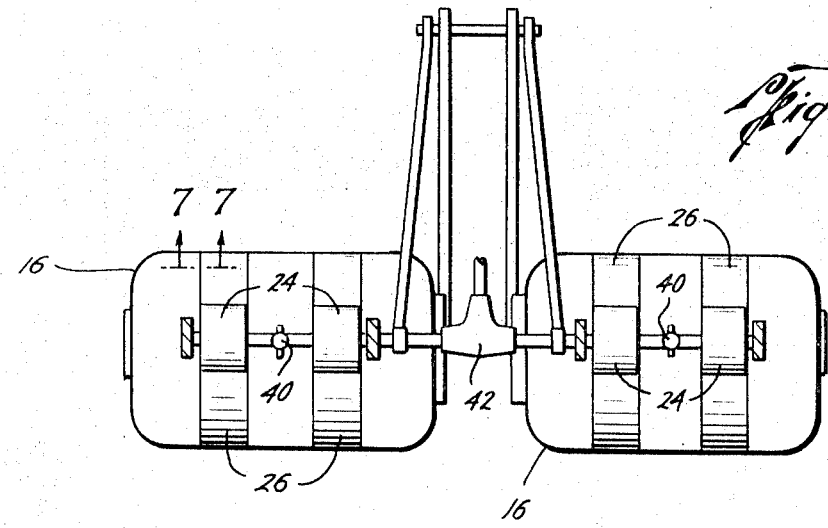
FIG. 6 is a cross-sectional view taken along line 6—6 of FIG. 5.

Referring now to FIGS. 5 and 6, another embodiment of the present invention is shown. This embodiment is similar to the embodiments of FIGS. 1-4 with the exception that the rollers 24 may be moved vertically into and out of contact with the wheels 16, such as by means of hydraulic rams 40 which raise and lower the rollers 24, and their drive differential 42. This embodiment of vertically moving the rollers 24 has the advantage that the amount of load desired to be carried by the rollers can be easily adjusted by the distance the rollers 24 are moved toward and against the wheels 16.

Figure 7:
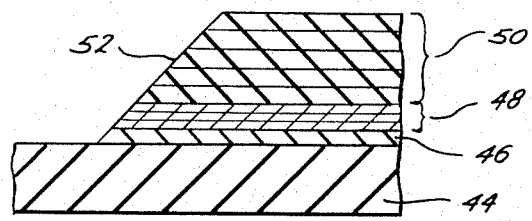
FIG. 7 is an enlarged fragmentary cross-sectional view illustrating the construction of the wheel of the present invention.

Preferably, the smooth portions 26 of the wheels 16 are built up or extend from the surface of the wheels 16 to form pads which can periodically be replaced as required. Referring now to FIG. 7, a fragmentary cross-sectional view of one example only of a pad of the smooth portion 26 of the wheel 16 is best seen. Generally, the roller 24 causes excessive wear at the contact edges of both the roller 24 and the wheel 16 and the roller 24 and wheel 16 surfaces may be soon worn beyond use. The use of a pad in the smooth portions 26 furnishes a wearing surface, a drive force surface, and a load bearing surface and avoids the possibility of wearing out the usual smooth tire in a short service period. The axial extent of the pad 26 is at least as great as the axial extent of the roller 24 for preventing the roller 24 from contacting and wearing out the outer periphery of the wheel 16. And, as best seen from FIGS. 2, 4 and 5, the outer surface of the pad 26 is and remains substantially parallel to the axle 18 of the wheels 16, even when under load, for reducing the difference of relative peripheral velocities between the pad 26 and the roller 24 for reducing wear therebetween. In the present invention, the axial extent of the pad 26 is less than the axial extent of the wheel 16 enabling the pad 26 to remain parallel to the axle of the wheel 16, as contrasted to the prior art in which the roller is in contact with the wheel periphery along substantially its axial length of the wheel whereby differences in the wheel diameter along its axial length caused the contact peripheral velocities of the wheel and roller to differ along their axial line of contact which caused excessive wear by scrubbing of the contacting surfaces. For example only, the pad 26, which is bonded to the carcass 44 of the wheel 16 may include a first layer 46 of .080 inch liner stock, three layers 48 of 0.044 rayon cord stock wrapped circumferentially and five layers 50 of 0.125 tread stock wrapped continuously and circumferentially around, to provide a height of approximately one inch, and extend outwardly approximately the same amount as the cleats 22. Both the pad 26 and the cleats 22 may be replaced when worn by retreading to the carcass 44. Of course, the exact construction, size and type of pad would be determined by the use, the load and the environment in which the vehicle is used.

The pad 26 construction described advantageously limits the crinking and loosening of the pad 26 from the carcass 44 of the wheel 16 under use. That is, the continuous circumferentially wrapping of the multiple layers 48 and 50, properly tensed, holds the pad 26 in place and to the carcass 44 of the wheel 16 and keeps the rubber in the carcass from stretching and tearing the pad from the carcass by the forces exerted by the rollers 24. Preferably, the pad 26 includes a transition portion 52 of decreasing thickness at each outer edge both to provide a greater bonding surface and flexibility relative to the outer edges of the pads 26 relative to the carcass 44 and to provide a wider pad 26 surface than the width of the contacting rollers 24. Such transition portion may be of any suitable contour such as quarter-round, skew, ogee or tapered as shown. Pads 26 and cleats 22 are more effective if tapered to the outer periphery of the wheel.

In use, the vehicle 10 may be powered through the differential 20 to provide an axial drive whereby the cleats 22 will provide traction under varying types of ground conditions. However, in the event that increased load capacity or drive performance is desired, one or more of the rollers 24 may be moved into engagement with the upper portion of the wheels 16 on the pads 26. The rollers 24 may function as either over-load rollers to support a portion of the load bearing structure 12 from the wheels 16, or in addition, may be driven through drive means 42 to provide drive solely by the rollers 24 or as additional drive power for the vehicle. Of course, if the rollers 24 are not needed, they are retracted away from the wheels to avoid unnecessary wear. And the vertical moving rollers of FIGS. 5 and 6, in particular, can be variably adjusted so that the amount of load carried by the rollers 24 can be easily adjusted. And, of course, the present invention may be used on a trailer vehicle by omitting the drive means.

The present invention, therefore, is well adapted to carry out the objects and attain the ends and advantages mentioned as well as others inherent therein.

What is claimed is:

1. A wheel for use in a vehicle having a load sustaining structure and at least one load sustaining roller connected to the structure comprising, an axially elongated, flexible-walled fluid-distensible ground contacting wheel, axle means positioned coaxially in said wheel for connection to and supporting the load sustaining structure of said vehicle, said wheel outer periphery including at least one smooth pad portion for contacting and supporting at least one load sustaining roller and extending radially outward from the periphery of said wheel and circumferentially extending about the wheel, the axial extent of said pad being less than the axial extent of said wheel, said axial extent of the pad being at least as great as the axial extent of said roller for preventing the roller from contacting the wheel periphery, and the outer surface of the pad being and remaining substantially parallel to the axle means when under load for reducing the difference of relative peripheral velocities between the pad and said roller.

2. The apparatus of claim 1 wherein said outer periphery of said wheel includes a plurality of said smooth pad portions.

3. The apparatus of claim 1 wherein said smooth pad portion includes, a plurality of continuously circumferentially wrapped layers of material.

4. The apparatus of claim 1 wherein said smooth pad portion includes, a transition portion decreasing inwardly at the outer edges to the wheel.

5. A wheel for use in a vehicle having a load sustaining structure and at least one load sustaining roller connected to the structure comprising, an axially elongated, flexible-walled, fluid-distensible, ground contacting wheel, axle means positioned coaxially in said wheel for connection to and supporting the load sustaining structure of the vehicle, said wheel outer periphery including a plurality of cleats extending outwardly for providing a gripping relationship with the ground, at least one portion of the outer periphery of said wheel being free of said cleats and including at least one smooth pad portion extending radially outward from the periphery of said wheel and extending circumferentially about said wheel for providing a continuous substantially smooth circumferential pad portion for contacting and supporting at least one load sustaining roller, the axial extent of said pad being less than the axial extent of said wheel, the axial extent of the pad being at least as great as the axial extent of said roller for preventing the roller from contacting the wheel, and the outer surface of the pad being and remaining substantially parallel to the axle means when under load for reducing the difference of relative peripheral velocities between the pad and said roller.

6. The apparatus of claim 5 wherein said outer periphery of said wheel includes a plurality of said cleat free smooth pad portions.

7. The apparatus of claim 5 wherein said smooth pad portion includes, a plurality of continuously circumferentially wrapped layers of material.

8. The apparatus of claim 5 wherein said smooth pad portion includes, a transition portion decreasing inwardly at the outer edges to the wheel.

* * * * *

UNITED STATES PATENT OFFICE
CERTIFICATE OF CORRECTION

Patent No. 3,799,917      Dated March 26, 1974

Inventor(s) Philip P. Rathke

It is certified that error appears in the above-identified patent and that said Letters Patent are hereby corrected as shown below:

Column 2, lines 68-69 - "compopent" should be -- component --;

Column 3, line 51 - "he" should be -- the --;

Column 3, line 66 - "polymerizale" should be -- polymerizable --;

Column 6, line 4 - "type" should be -- types --;

Column 7, line 11 - "persent" should be -- present --;

Column 12, line 68 - "remain" should be -- remained --;

Column 13, line 11 - "reach" should be -- reached --;

Column 13, line 26 - "trhough" should be -- through --;

Claim 1, line 5 - delete "solid";

Claim 1, line 5 - insert -- chloride -- after "vinyl";

Claim 17, line 1 - "claim 15" should be -- claim 16 --.

Signed and sealed this 22nd day of October 1974.

(SEAL)
Attest:

McCOY M. GIBSON JR.
Attesting Officer

C. MARSHALL DANN
Commissioner of Patents